United States Patent
Mitchell et al.

(10) Patent No.: US 12,374,230 B2
(45) Date of Patent: Jul. 29, 2025

(54) AEROSPACE ANTENNA AND NETWORK SYSTEM FOR SIMULTANEOUSLY DELIVERING INTERNET TO AIRCRAFT AND REPORTING AIR QUALITY INDEX PARAMETERS

(71) Applicant: Rockwell Collins, Inc., Cedar Rapids, IA (US)

(72) Inventors: James P Mitchell, Cedar Rapids, IA (US); Sitaram Ramaswamy, West Hartford, CT (US); Philip Harris, County Cork (IE)

(73) Assignee: Rockwell Collins, Inc., Cedar Rapids, IA (US)

( * ) Notice: Subject to any disclaimer, the term of this patent is extended or adjusted under 35 U.S.C. 154(b) by 245 days.

(21) Appl. No.: 18/141,667

(22) Filed: May 1, 2023

(65) Prior Publication Data

US 2024/0371282 A1    Nov. 7, 2024

(51) Int. Cl.
*G08G 5/76*    (2025.01)
*G01S 13/95*    (2006.01)

(52) U.S. Cl.
CPC .............. *G08G 5/76* (2025.01); *G01S 13/953* (2013.01)

(58) Field of Classification Search
CPC ......... G08G 5/76; G01S 13/953; Y02A 90/10; G01W 1/02; G01W 1/08
See application file for complete search history.

(56) References Cited

U.S. PATENT DOCUMENTS

| 5,927,648 A | 7/1999 | Woodland |
| 2007/0073486 A1 | 3/2007 | Tillotson et al. |
| 2010/0332056 A1 | 12/2010 | Kirk |
| 2015/0304813 A1 | 10/2015 | Esposito et al. |
| 2024/0167426 A1* | 5/2024 | Lincoln ..................... F02C 9/28 |
| 2024/0182181 A1* | 6/2024 | Sanzone ................. G06F 30/27 |

FOREIGN PATENT DOCUMENTS

| EP | 3599166 A1 | 1/2020 |
| JP | 2019200116 A | 11/2019 |
| KR | 102185273 B1 * | 12/2020 |
| WO | WO-2022085745 A1 * | 4/2022 |

OTHER PUBLICATIONS

English translation for WO-2022085745-A1 (Year: 2022).*
English translation for KR-102185273-B1 (Year: 2020).*
English translation for JP 2019200116 A (Year: 2019).*
European Patent Office, Extended European Search Report received in EP Application No. 23210637.7, May 24, 2024, 7 pages.

* cited by examiner

*Primary Examiner* — Justin S Lee
(74) *Attorney, Agent, or Firm* — Suiter Swantz IP

(57) ABSTRACT

A system collects air samples at altitude and shares data among aircraft in a network. The system includes an antenna with an antenna housing; the housing defines air inlets and outlets. While in flight, air samples are collected through the inlets, processed via sensors, and allowed to flow through to the outlet. Air quality data, including, but not limited to, contrail humidity, gas content, and particle density and size, may be transmitted to other aircraft in a network via the antenna. Air quality measurements are geolocated and correlated from different platforms at different altitudes. A data model or machine learning artificial intelligence may utilize the geolocated air quality data to make certain predictions.

18 Claims, 6 Drawing Sheets

AEROSPACE ANTENNA AND NETWORK SYSTEM FOR SIMULTANEOUSLY DELIVERING INTERNET TO AIRCRAFT AND REPORTING AIR QUALITY INDEX PARAMETERS

BACKGROUND

There is fast growing and heightened concern today of how our atmosphere is being affected by world-wide industrial carbon emissions, automobiles, aircraft contrails, agriculture carbon, carbon emissions from factories and other non-precipitating pollutants that linger for decades and how quickly these changes are occurring and to what degree it affects our weather, air travel and the ripple effect it has on the entire health of our planet. The aircraft is one example of reason for these environmental changes, however as this invention with show it can also be used as a platform as an exceptional opportunity to geospatially measure in real-time the density and propagation of these undesirable compounds. Current day existing aircraft and avionics systems have no widespread global mechanism to collect and share air quality data at altitude. Furthermore, collecting air quality data with dedicated additional equipment installations would add additional drag, weight, certification delays and/or other flight and aircraft inefficiencies when attempting to take air samples. It would therefore, be advantageous if a more global system existed to collect air samples at altitude and share data with other aircraft the atmospheric conditions influenced by contrails and other air quality data with agencies interested in collecting and developing and identifying trends in our atmosphere. This invention utilizes widespread commercial aircraft platforms, existing commercial communications links and available COTS sensors as a solution in addition to the very limited number of research aircraft currently being deployed.

SUMMARY

In one aspect, embodiments of the inventive concepts disclosed herein are directed to a system for collecting air samples at altitude and sharing data among aircraft in a network. The system includes an antenna with an antenna housing; the housing defines air inlets and outlets. While in flight, air samples are collected through the inlets, processed via sensors, and optionally allowed to flow through to an outlet. Air quality data parameters of one of several indexes may be locally processed, stored and re-transmitted to other aircraft in a network via the antenna. Furthermore, the unified aerodynamic antenna, radio and sensor system may be used to deliver sampled sensor data via a satellite communications network or via an air-to-ground network where it may be directed to an operations center for analysis for developing actionable information for optimizing air travel (route decisions) and also to advise weather agencies and research agencies interested in tracking atmospheric conditions and trends important to predicting weather and future flight conditions. The data may also be provided to agencies interested in tracking particulate, and aerosols of interest to assist in research and to assist in proactive responses to health concerns, including health advisories and certain energy use abatements for reducing $CO_2$ concentrations and other particulates regionally.

In a further aspect of this invention, air quality measurements are geolocated in real-time and correlated from different platforms at different altitudes. A data model or machine learning artificial intelligence processor on the aircraft or at a ground center may utilize the geolocated air quality data to make certain predictions.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
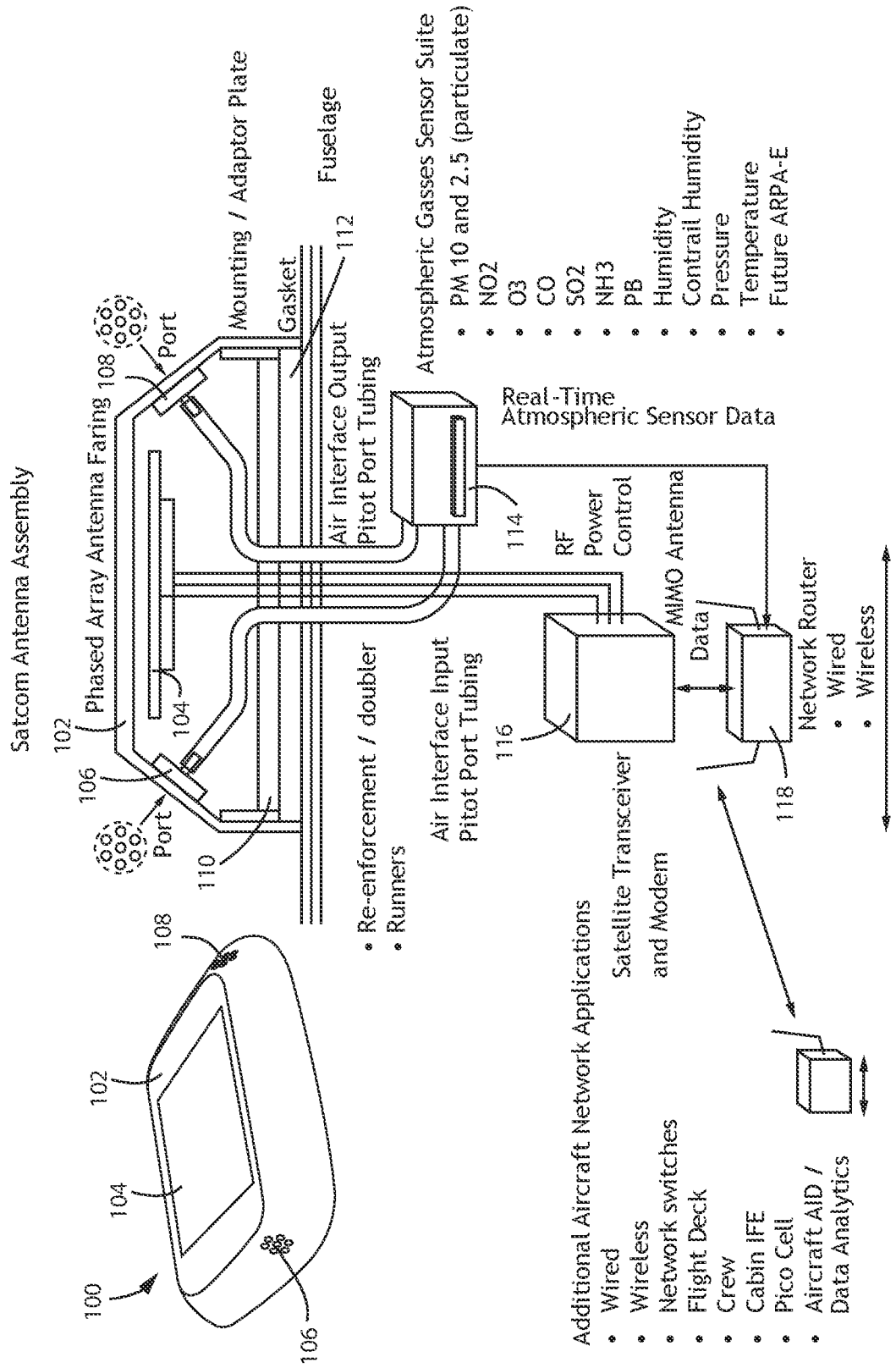
FIG. 1 shows a block diagram of a system according to an exemplary embodiment.

Before explaining various embodiments of the inventive concepts disclosed herein in detail, it is to be understood that the inventive concepts are not limited in their application to the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of a feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following:

A is true (or present) and B is false (or not present), A is false (or not present) and B is true (or present), and both A and B are true (or present).

In addition, use of "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Also, while various components may be depicted as being connected directly, direct connection is not a requirement. Components may be in data communication with intervening components that are not illustrated or described.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in at least one embodiment" in the specification does not necessarily refer to the same embodiment. Embodiments of the inventive concepts disclosed may include one or more of the features expressly described or inherently present herein, or any combination or sub-combination of two or more such features.

Broadly, embodiments of the inventive concepts disclosed herein are directed to a system for collecting air samples at altitude and sharing data among aircraft in a network. The system includes an antenna with an antenna housing; the housing defines air inlets and outlets. While in flight, air samples are collected through the inlets, processed via sensors, and allowed to flow through to the outlet. Air quality data may be transmitted to other aircraft in a network via the antenna. Air quality measurements are geolocated and correlated from different platforms at different altitudes. A data model or machine learning artificial intelligence may utilize the geolocated air quality data to make certain predictions.

Referring to FIG. 1, a block diagram of a system according to an exemplary embodiment is shown. The system includes an antenna housing 100 or faring that contains an antenna 104 such as an electronically scanned array antenna, low-earth orbit satellite antenna, Starlink antenna, or other antenna structures. The antenna housing 100 defines at least one air inlet port 106. The air inlet port 106 allows airflow to an atmospheric gas sensor suite 114 in flight. Atmospheric gasses pass through the gas sensor suite 114 and may be expelled via an air outlet port 108. The air outlet port 108 may be defined by the antenna housing 100. In at least one embodiment, the air inlet port 106 is disposed in a forward surface of the antenna housing 100 and the air outlet port 108 is disposed in an aft surface of the antenna housing 100.

The antenna 104 is configured and driven by a transceiver 116. The transceiver 116 may establish a datalink with a satellite system. A network device 118 (including, but not limited to, 5G and 6G network devices) may receive air quality data from the gas sensor suite 114 and transmit the air quality data to the satellite system. Other aircraft connected to the satellite system (or a shared ground network) may receive the air quality data; on-board avionics systems may use such air quality data when making atmospheric predictions for flight. The antenna 104 may also obtain and provide location information such as GPS data. Furthermore, such location data may include an altitude provided by the antenna 104 or a separate avionics system including a LIDAR system disposed on an inferior (bottom) surface of an aircraft. Such location and altitude data may be provided to remote aircraft or ground stations along with the corresponding air quality data. Data may be forwarded immediately in real-time, or stored for later delivery in a memory at a scheduled time. Furthermore, the system may share LIDAR based updraft determinations.

In at least one embodiment, a processor, which may embody a machine learning algorithm or trained artificial intelligence, receives atmospheric air quality data and analyzes the air quality data in real-time for trends and preform and include or use stochastic analysis, Bayesian probabilities and/or include Markov predictive processes for supplementing or augmenting an AI computing process within a computing device associated with the sensor suite. Location and altitude data may be associated with each air quality data point and comprise an additional input during analyses. Air quality data, including location and altitude data, may be used to develop a ground-based aircraft crowd sourced database of regional and/or global data providing 3D atmospheric gas parametrics.

In at least one embodiment, an end-user data processing center may use or forward global atmospheric data for the purpose of weather forecasting, aerospace anomaly forecasting, pollution control, contrail effects, pollution forecasting, aircraft flight plan optimization in order to improve airline schedules and operational costs, and to help improve and monitor societal air quality issues.

Broadband antennas 104 are generally installed for the purpose of bringing Internet to the aircraft. Such antennas 104 provide a functionality for monitoring carbon emissions, contrail humidity, and other air quality parameters. Embodiments of the present disclosure enable communication to and from the aircraft to continuous collect air samples and conduct real-time air quality measurements by using a comprehensive gas sensor suite 114. Such sensor suite 114 may be a valuable cloud sourced data for downstream optimization of air traffic management in the airspace.

Figure 2:
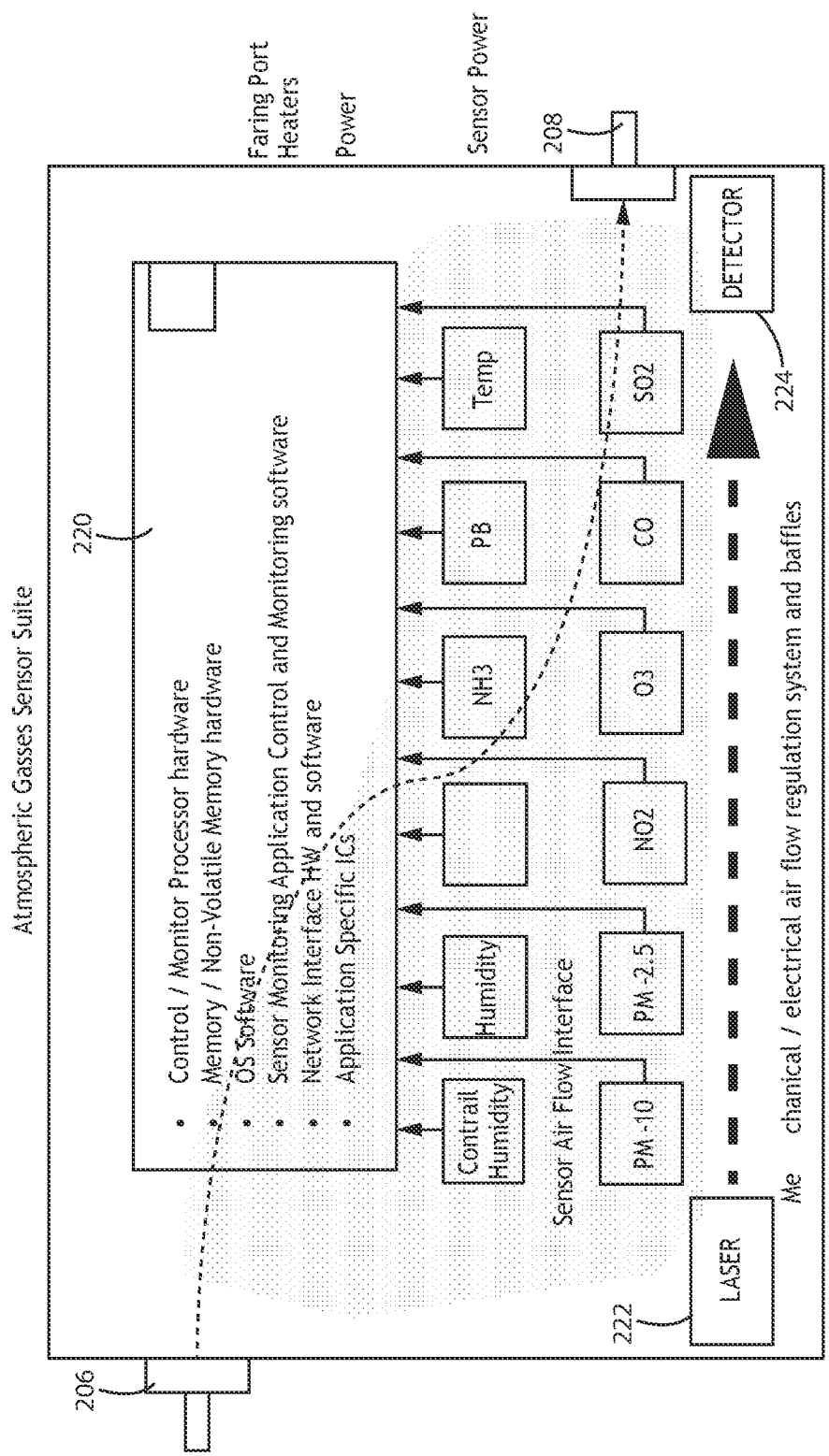
FIG. 2 shows a block diagram of a system according to an exemplary embodiment.

Referring to FIG. 2, a block diagram of a system according to an exemplary embodiment is shown. An on-aircraft atmospheric gas sensor suite receives atmospheric gases via an inlet 206 disposed in an antenna housing. A processor 220 receives atmospheric gas data from a plurality of sensors; such sensors may measure temperature, humidity, contrail humidity, $NO_2$, $O_3$, $SO_2$, $CO$, $CO_2$, particle counter (e.g., light scattering photodetector particle counters and size detectors) or the like. A housing according to the inventive concepts disclosed herein provide a collection volume to enable particle detection via 10 micron inferred wavelengths reliant upon light scattering rather than absorption. Contrail humidity may employ state-of-the art particle count and size measurements using optics for detecting the smallest particles associated with contrails. Furthermore, the contrail humidity sensor function may utilize a substantially larger enclosure for greater optical systems and larger gas volumes otherwise not available to other commercial approaches using simple pass-through pitot tubes. Contrail humidity sensing is very challenging given the size and density of moisture or ice. Embodiments of the present disclosure utilize a large enclosure (as opposed to a pitot tube) to enable detecting minute humidity concentrations. In at least one embodiment, light and sensing optics inside the enclosure detect moisture that is harder to capture with existing systems.

In at least one embodiment, a laser 222 and corresponding detector 224 within the enclosure may be used for moisture sensing. The laser 222 and detector 224 can be changed in beam intensity and wavelength to actively measure minute contrail absorption levels. The length of the laser path may be extended by internal reflectors; extending the laser path enables the laser to capture more gas volume in the enclosure, thereby improving absorptions sensitivity. Alternatively, or in addition, switching air tubes within the enclosure may trap gas for extended analysis. In at least one embodiment, a laser head and control system can operate in IR, visible, and UV wavelengths. Shorter wavelengths (e.g., UV) respond to smaller humidity components than longer wave.

In at least one embodiment, the atmospheric gas sensor suite may define internal airflow chambers. Such chambers may be mechanical, defined by baffles, or defined by electromechanically switched and directed airflow.

Figure 3:
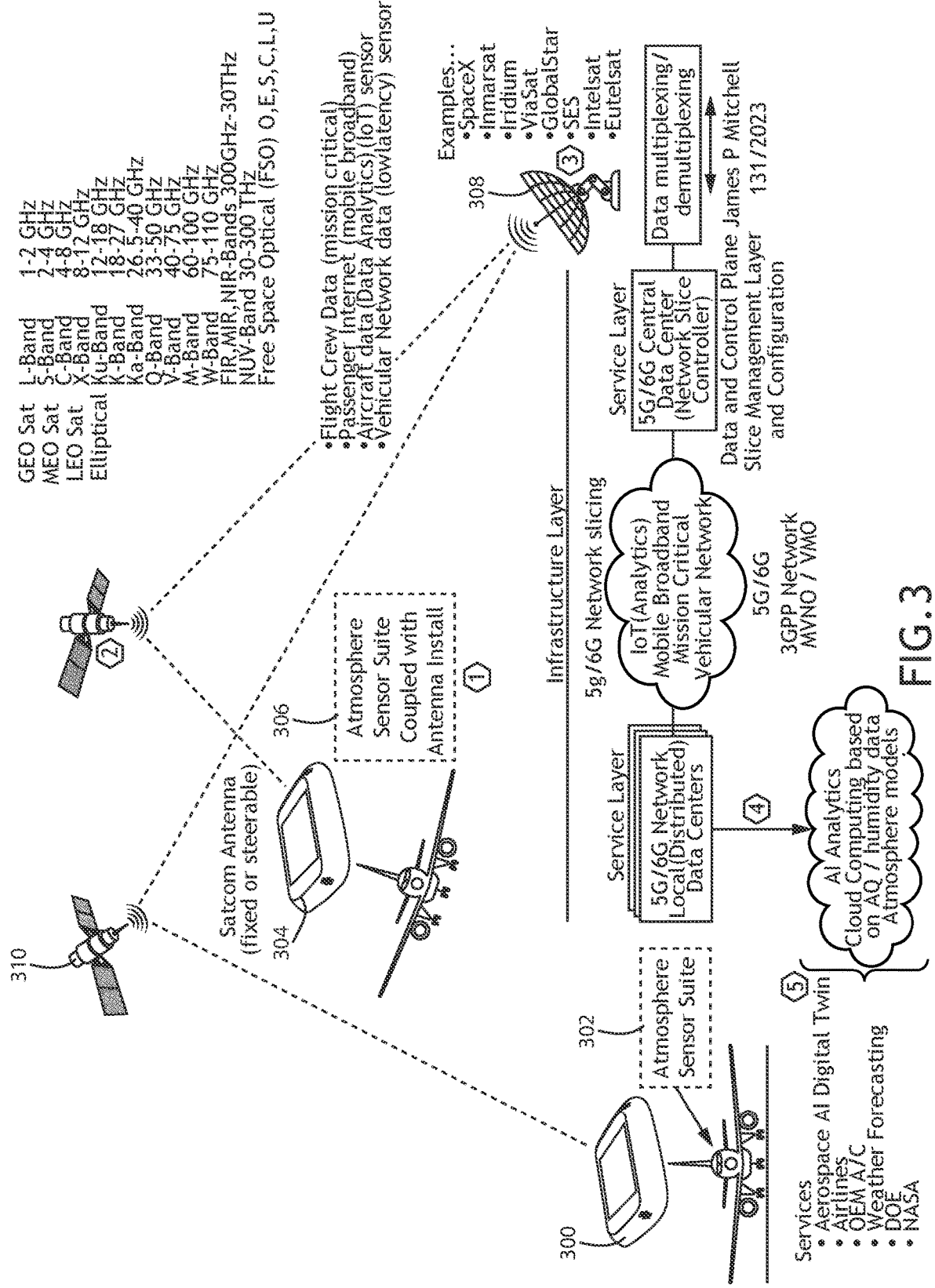
FIG. 3 shows a block diagram of a system according to an exemplary embodiment.

Referring to FIG. 3, a block diagram of a system according to an exemplary embodiment is shown. The system includes a plurality of aircraft, each incorporating one or more antennas with antenna housings 300, 304 having atmospheric air inlets defined by the housing. Each aircraft receives air samples and analyses the air samples in real-time via an on-board atmospheric sensor suite 302, 306.

The system may define a network including each aircraft. The aircraft may communicate and share atmospheric data directly, or via one or more satellites 310 and/or ground based communication infrastructure 308. In at least one embodiment, some portion of the ground based communication infrastructure 308 may include processing and storage capacity to receive geolocated atmospheric data from the aircraft. The geolocated atmospheric data may be analyzed via an artificial intelligence for applications such as weather prediction, contrail dissipation predictions, monitoring vertical updraft velocity, or the like. Furthermore, the system may build local, regional, and/or global atmospheric models over time in the aircraft system and/or the ground system.

In at least one embodiment, the system may be utilized for real-time atmospheric monitoring. For example, each aircraft may monitor atmospheric quality at various altitudes over time, including under various conditions that are identifiable by the aircraft via other on-board sensors such as LIDAR, RADAR, or the like.

Geolocated sensor data from each aircraft may be correlated over time. Each aircraft represents a crowdsourcing node for gathering data points. It may be appreciated that each antenna may be configured for low earth orbit satellite communication, and/or any of a number of other communication satellite orbits or bands.

Figure 4:
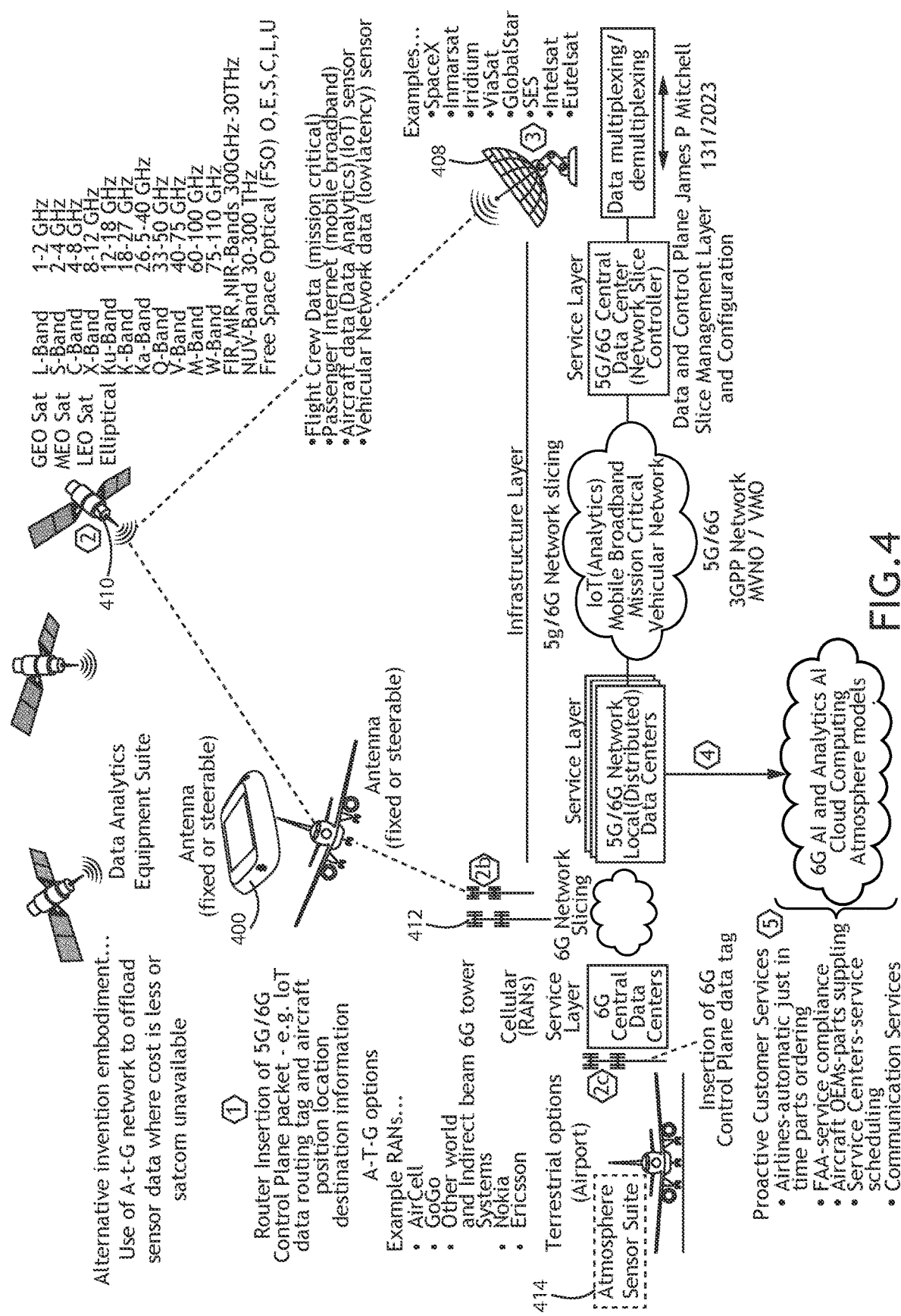
FIG. 4 shows a block diagram of a system according to an exemplary embodiment.

Referring to FIG. 4, a block diagram of a system according to an exemplary embodiment is shown. The system defines a network including a plurality of aircraft, each incorporating one or more antennas with antenna housings 400 having atmospheric air inlets defined by the housing. Each aircraft receives air samples and analyses the air samples in real-time via an on-board atmospheric sensor suite 414. Aircraft may supply atmospheric data even when on the ground, at an airport. The network may include one or more satellites 410 and/or ground based communication infrastructure 408, including cellular infrastructure 412.

Figure 5:
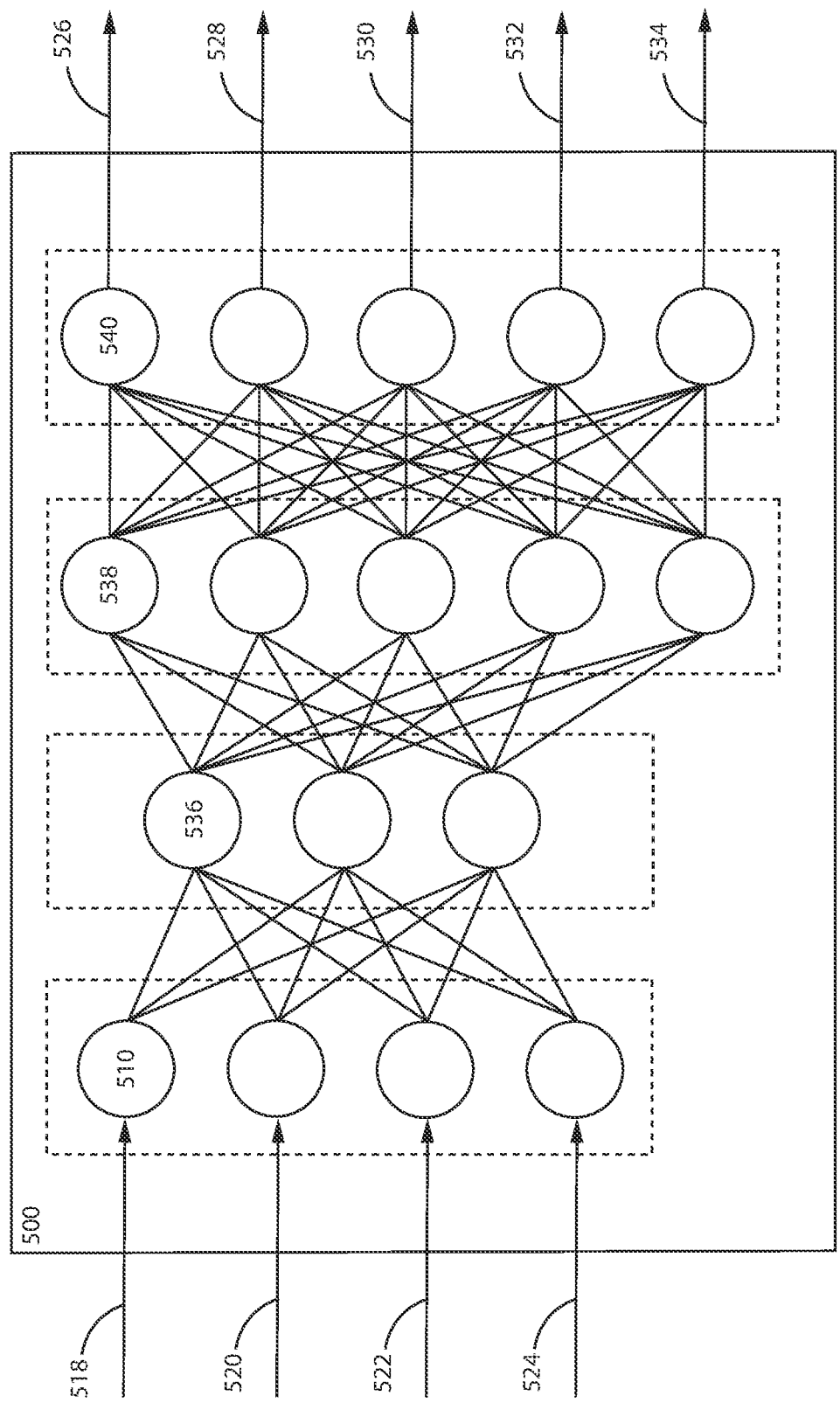
FIG. 5 shows a block diagram of a neural network according an exemplary embodiment of the inventive concepts disclosed herein.

Referring to FIG. 5, a block diagram of a neural network 500 according an exemplary embodiment of the inventive concepts disclosed herein is shown. The neural network 500 comprises an input layer 502, and output layer 504, and a plurality of internal layers 506, 508. Each layer comprises a plurality of neurons or nodes 510, 536, 538, 540. In the input layer 502, each node 510 receives one or more inputs 518, 520, 522, 524 corresponding to a digital signal and produces an output 512 based on an activation function unique to each node 510 in the input layer 502. An activation function may be a Hyperbolic tangent function, a linear output function, and/or a logistic function, or some combination thereof, and different nodes 510, 536, 538, 540 may utilize different types of activation functions. In at least one embodiment, such activation function comprises the sum of each input multiplied by a synaptic weight. The output 512 may comprise a real value with a defined range or a Boolean value if the activation function surpasses a defined threshold. Such ranges and thresholds may be defined during a training process. Furthermore, the synaptic weights are determined during the training process. Outputs 512 from each of the nodes 510 in the input layer 502 are passed to each node 536 in a first intermediate layer 506. The process continues through any number of intermediate layers 506, 508 with each intermediate layer node 536, 538 having a unique set of synaptic weights corresponding to each input 512, 514 from the previous intermediate layer 506, 508. It is envisioned that certain intermediate layer nodes 536, 538 may produce a real value with a range while other intermediated layer nodes 536, 538 may produce a Boolean value. Furthermore, it is envisioned that certain intermediate layer nodes 536, 538 may utilize a weighted input summation methodology while others utilize a weighted input product methodology. It is further envisioned that synaptic weight may correspond to bit shifting of the corresponding inputs 512, 514, 516.

An output layer 504 including one or more output nodes 540 receives the outputs 516 from each of the nodes 538 in the previous intermediate layer 508. Each output node 540 produces a final output 526, 528, 530, 532, 534 via processing the previous layer inputs 516. Such outputs may comprise separate components of an interleaved input signal, bits for delivery to a register, or other digital output based on a n input signal and DSP algorithm; each comprising some element of a weather prediction, updraft prediction, contrail dissipation prediction or the like.

In at least one embodiment, each node 510, 536, 538, 540 in any layer 502, 506, 508, 504 may include a node weight to boost the output value of that node 510, 536, 538, 540 independent of the weighting applied to the output of that node 510, 536, 538, 540 in subsequent layers 504, 506, 508. It may be appreciated that certain synaptic weights may be zero to effectively isolate a node 510, 536, 538, 540 from an input 512, 514, 516, from one or more nodes 510, 536, 538 in a previous layer, or an initial input 518, 520, 522, 524.

In at least one embodiment, the number of processing layers 502, 504, 506, 508 may be constrained at a design phase based on a desired data throughput rate. Furthermore, multiple processors and multiple processing threads may facilitate simultaneous calculations of nodes 510, 536, 538, 540 within each processing layers 502, 504, 506, 508.

Layers 502, 504, 506, 508 may be organized in a feed forward architecture where nodes 510, 536, 538, 540 only receive inputs from the previous layer 502, 504, 506 and deliver outputs only to the immediately subsequent layer 504, 506, 508, or a recurrent architecture, or some combination thereof.

Figure 6B:
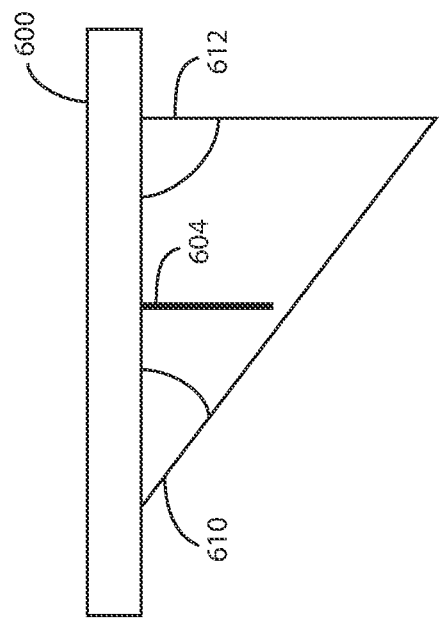
FIG. 6B shows a side view of a lower aircraft antenna housing according to an exemplary embodiment.
Figure 6A:
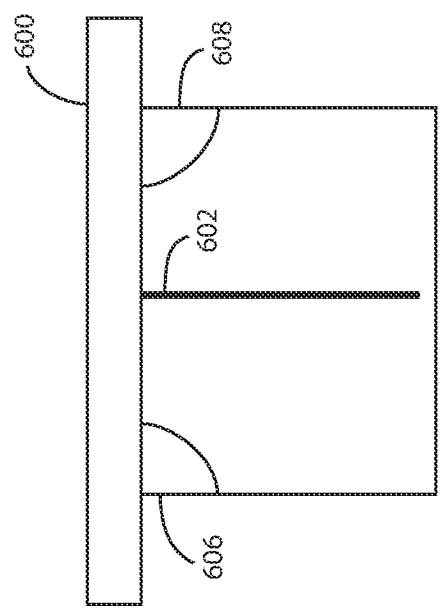
FIG. 6A shows a side view of a lower aircraft antenna housing according to an exemplary embodiment.

Referring to FIGS. 6A-6B, side views of lower aircraft antenna housings according to exemplary embodiments are shown. While embodiments described herein are generally directed to ward satellite antenna housings disposed on the top surface of an aircraft, the inventive concepts are applicable to antenna housings disposed on a bottom surface 600 of the aircraft. Such embodiments include an antenna 602, 604 such as a ground communication antenna, radio altimeter, or the like. A housing enclosing the antenna 602, 604 includes an input port and tube 606, 610. Air entering the housing through the input port and tube 606, 610 may be analyzed via a sensor suite within the housing and communicated to remote systems, including other aircraft and ground stations. The sensor suite may include a laser and detector to utilize the space inside the enclosure to determine moisture content. In at least one embodiment, air may flow through the housing and exit via an output port and tube 608, 612.

Embodiments of the present disclosure enable collection of real-time sensor data and deployment of a real-time 3D atmospheric database. An artificial intelligence system may indicate the effect of air quality, contrail humidity, etc. It may also take measures for controlling air quality in certain regions where the daily dynamics of weather make it otherwise hard to predict.

By aerodynamically combining an otherwise deployed antenna with an air sampling system, a big savings and faster time to market is realized by requiring only one fuselage certification for what would otherwise require two certifications to install separate systems. Additionally, the antenna and accompanying communications system provides an immediate link to other aircraft and/or ground systems for interpreting measurements obtained to optimize the flights of other aircraft in real-time.

It is believed that the inventive concepts disclosed herein and many of their attendant advantages will be understood by the foregoing description of embodiments of the inventive concepts, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The forms herein before described being merely explanatory embodiments thereof, it is the intention of the following claims to encompass and include such changes. Furthermore, any of the features disclosed in relation to any of the individual embodiments may be incorporated into any other embodiment.

What is claimed is:

1. An aircraft antenna element comprising:
   an aircraft antenna;
   an antenna housing;
   an atmospheric gas sensor suite; and
   at least one processor connected to a memory for embodying processor executable code,
   wherein:
   the antennas housing defines an air inlet;
   the air inlet is in fluid communication with the atmospheric gas sensor suite; and
   the processor executable code configures the at least one processor to:
   receive sensor data from the atmospheric gas sensor suite;
   produce a contrail dissipation prediction based on the sensor data;
   establish a data connection via the aircraft antenna; and
   transmit the atmospheric gas sensor data to a network via the data connection.

2. The aircraft antenna element of claim 1, wherein the aircraft antenna comprises a low earth orbit satellite antenna.

3. The aircraft antenna element of claim 1, wherein the atmospheric gas sensor suite comprises at least a humidity sensor, a temperature sensor, and a light scattering particulate sensor.

4. The aircraft antenna element of claim 1, wherein the at least one processor is further configured to:
   receive a location corresponding to the sensor data; and
   tag the sensor data with the location.

5. The aircraft antenna element of claim 4, wherein the at least one processor is further configured to determine an altitude and tag the sensor data with one of a latitude, longitude and altitude.

6. The aircraft antenna element of claim 5, wherein the at least one processor is further configured to:
   receive data from a LIDAR; and
   determine the altitude based on the LIDAR data.

7. The aircraft antenna element of claim 1, wherein the antenna housing defines an air outlet.

8. A method comprising:
   receiving an air sample via an inlet in an aircraft antenna housing;
   processing the air sample via sensors in an atmospheric gas sensor suite to produce sensor data;
   determining a location corresponding to the sensor data;
   tagging the sensor data with the geospatial location;
   producing a contrail dissipation prediction based on the sensor data;
   establishing a data connection via an aircraft antenna; and
   transmitting the sensor data to a network via the data connection.

9. The method of claim 8, further comprising producing an updraft velocity prediction based on the sensor data.

10. The method of claim 8, further comprising correlating sensor data from a plurality of aircraft based on location and a sampling time.

11. The method of claim 10, further comprising analyzing the correlated sensor data via a trained artificial intelligence.

12. A system comprising:
   a plurality of aircraft, each comprising:
   an aircraft antenna;
   an atmospheric gas sensor suite;
   an antenna housing defining an air inlet defining an air inlet in fluid communication with the atmospheric gas sensor suite;
   at least one processor connected to a memory for embodying processor executable code to configure the at least one processor to:
   receive sensor data from the atmospheric gas sensor suite;
   produce a contrail dissipation prediction based on the sensor data;
   establish a data connection via the aircraft antenna;
   transmit the atmospheric gas sensor data to a network via the data connection; and
   receive remote atmospheric sensor data from other of the plurality of aircraft via the data connection.

13. The system element of claim 12, wherein the atmospheric gas sensor suite comprises at least a humidity sensor, a temperature sensor, and a light scattering particulate sensor.

14. The system element of claim 12, wherein the at least one processor is further configured to:
   receive a location corresponding to the sensor data; and
   tag the sensor data with the location.

15. The system element of claim 14, wherein the at least one processor is further configured to determine an altitude and tag the sensor data with the altitude.

16. The system of claim 12, further comprising at least one ground station configured to receive atmospheric sensor data from the plurality of aircraft and compile the atmospheric sensor data into a database.

17. The system of claim 16, wherein the ground station is configured to analyze the database of atmospheric sensor data via a trained artificial intelligence to provide actionable data.

18. The system of claim 12, further comprising a laser and detector disposed within the housing to measure humidity.

\* \* \* \* \*